United States Patent [19]

McIntyre et al.

[11] 4,382,993

[45] May 10, 1983

[54] TIRE CORD FINISH, POLYESTER CORD PRODUCED THEREWITH AND TIRES USING THE POLYESTER CORD

[75] Inventors: Russell T. McIntyre, Hilliard, Ohio; John P. Redston, Montclair, N.J.

[73] Assignee: Stokely-Van Camp, Inc., Indianapolis, Ind.

[21] Appl. No.: 271,430

[22] Filed: Jun. 8, 1981

[51] Int. Cl.$^3$ ............... B29H 9/04; D06M 13/20; D06M 15/08

[52] U.S. Cl. .............. 428/395; 156/110 A; 156/110 C; 252/8.6; 252/8.9; 428/295

[58] Field of Search .............. 252/8.6, 8.9; 428/395, 428/295; 156/110 A, 110 C

[56] References Cited

U.S. PATENT DOCUMENTS

| | | | |
|---|---|---|---|
| 2,964,470 | 12/1960 | Wentworth | 252/8.8 |
| 3,113,369 | 12/1963 | Barrett et al. | |
| 3,248,258 | 4/1966 | Coats | |
| 3,387,966 | 6/1968 | Morana et al. | |
| 3,428,560 | 2/1969 | Olsen | 252/8.7 |
| 3,464,922 | 9/1969 | Bernholz et al. | 252/8.6 |
| 3,470,095 | 9/1969 | Pontelandolfo | 252/8.9 |
| 3,575,856 | 4/1971 | Anton | 252/8.9 |
| 3,672,977 | 6/1972 | Dardoufas | |
| 3,687,721 | 8/1972 | Dardoufas | |
| 3,730,892 | 5/1973 | Marshall et al. | 252/8.75 |
| 3,850,658 | 11/1974 | Gomez et al. | 252/8.8 |
| 3,853,607 | 12/1974 | Iyengar et al. | 252/8.6 |
| 3,962,516 | 6/1976 | Marshall et al. | |
| 4,019,990 | 4/1977 | Marshall et al. | 252/8.9 |
| 4,086,949 | 5/1978 | Uy | |
| 4,105,568 | 8/1978 | Marshall et al. | 252/8.6 |
| 4,126,564 | 11/1978 | Marshall et al. | 252/8.9 |

Primary Examiner—James C. Cannon
Attorney, Agent, or Firm—Woodard, Weikart, Emhardt & Naughton

[57] ABSTRACT

A tire cord finish composition comprising transesterified high oleic oil and high lauric oil, polyoxyethylene castor oil, triglycerol monooleate and/or triglycerol dioleate, decaglycerol tetraoleate and/or decaglycerol pentaoleate, and 4,4' butylidene-bis (6-tert-butyl-m-cresol). Methods for preparing the tire cord composition and applying the composition to polyester cord are also disclosed, as is the resultant polyester cord and tires produced therewith.

29 Claims, No Drawings

TIRE CORD FINISH, POLYESTER CORD PRODUCED THEREWITH AND TIRES USING THE POLYESTER CORD

BACKGROUND OF THE INVENTION

1. Field of the Invention:

The present invention relates to a tire cord fluid finish composition and method for finishing polyester cord, and is further related to the resultant cord and tires produced therewith.

2. Description of the Prior Art:

In the processing of filamentary material, it has been recognized by all those concerned that the development and application of critically selected ingredients with specific intrinsic properties in an homogenous blend or finish is essential to develop the full latent potential of the polyester fibers as a valuable and reliable tire cord. These fluids typically comprise lubricants, emulsifiers and wetting agents, plus additional ingredients necessary to assist in processing of the materials. The required properties of such individual materials and their beneficial effect on one another are well known to those versed in the art. Such properties are good fiber to fiber and fiber to metal lubricity; adequate but not excessive, also static suppression, good rubber adhesion, ability to form stable aqueous emulsions of less than one micron size, excellent wetting of the fiber, and complete compatibility with the resorcinol formaldehyde latex and other "dips" used in the process of adhering fiber to rubber. These and other more esoteric properties are essential to the manufacture of safe tires for automobiles, "off the road" construction and wheeled military armaments and carriers, airplane tires, etc. These properties are also important for other items such as hoses, V belts, revolving belts as people carriers, post office and other conveyor belts, etc.

The problems and parameters involved in processing filamentary material are discussed in detail in U.S. Pat. No. 3,687,721, issued to Dardoufas on Aug. 29, 1972, and this discussion is incorporated herein by reference. As noted in the Dardoufas patent, a method and composition to allow proper wettability and lubricity is necessary for the preparation of improved industrial yarns. Further, emulsifiers having a proper HLB, hydrophilic-lipophilic balance, are important. Also, the treating fluid components must be capable of resisting heat treatment of temperatures perhaps as high as 250° C. without volatizing or significantly altering the lubricity, stability and functionality of the fluid. The blended fluid ingredients should provide good lubricity to avoid abrasion and wearing of the filamentary material or the processing equipment. The use of antioxidants is also helpful to assist in resisting aging and heat deterioration of the filaments and finish.

There has been a withdrawal from the market of some chief finishes based on fossil fuel derivatives. Such finishes and others have formed highly undesirable resinous deposits on hot metal processing equipment. In addition such fossil fuel derivatives often do not possess sufficient inherent high thermal stability to meet new demands of federal and state regulatory agencies in respect to emissions from rubber tire manufacturing plants. A new composition to answer such problems is desirable, particularly one based on readily renewable and readily available raw materials annual agricultural sources of vegetable and animal fats and oils. Fossil fuels are not replaceable, subject to other uses or higher priorities and subject to escalating costs.

The present invention overcomes three important problems currently facing those concerned with producing satisfactory finishes for polyester yarn used in rubber tires for automobiles, etc. First, one of the very best and widely used fossil fuel derivatives for polyester tire cord purposes is no longer domestically available due to the "energy crunch". The present invention supplies a replacement based on continually replenished natural fats and oils. Second, current finishes often suffer from a propensity to polymerize into hard black water-insoluble deposits on hot metal equipment forcing shut down of equipment for cleaning. The addition of strong alkali is sometimes recommended, while another answer is the use of steam-cleaning jets to keep equipment clean. The present invention requires no such auxiliary measures, which introduce expense and other problems. Third, the present invention provides a thermally stable product that will not contravene the rules of state regulatory agencies in respect to emissions from rubber tire manufacturing plants as shown in Guideline Series: Measurement of Volatile Organic Compounds, United States Environmental Protection Agency, Office of Air Quality Planning & Standards, EPA-450/2-78-041, OAQPS No. 1.2-115 rev Sept. 79.

For many years hexadecyl or isocetyl stearate has been a preferred lubricant for use in tire yarn finishes, as much as 75% being used in the compounded formulation. Due to the "energy crunch" it is no longer readily available. A new finish must be found of which continuous delivery can be assured. The popularity of hexadecyl stearate and other esters of hexadecyl alcohol for this purpose is attested to in U.S. Pat. Nos. 3,428,560, issued to Olsen on Feb. 18, 1969; 3,575,856, issued to Anton on Apr. 20, 1971; 3,687,721, issued to Dardoufas on Aug. 29, 1973; 3,730,892, issued to Marshall and Dardoufas on May 1, 1973; and 3,850,658, issued to Gomez et al. on Nov. 26, 1974. The expense of evaluating a new finish for tire cord purposes is an extremely lengthy and expensive operation. The unavailability of a satisfactory and proven lubricant in self-emulsifiable form represents a serious economic loss.

As is evidenced by the prior art, a variety of finish compositions have been proposed for use with various filamentary materials. The present invention provides a finish composition particularly adapted for use with polyester cord. The term cord is used herein to include the variety of filamentary forms of the polyester material, whether it be filaments, fibers, yarns, threads or similar forms. The present invention further provides a method for the treating of polyester cord, and a resulting cord which is advantageous for processing in normal fashion.

The prior art has concerned itself chiefly with finding a satisfactory lubricant to impart to the fiber sufficient lubricity to slide over metal, wood and plastic surfaces without cutting such surfaces or being abraded by them. A further concern is to supply just sufficient lubricity to all the individual fibers so that they can slide over one another and yet have sufficient cohesion that filaments would stay together as a collection of filaments in yarn form and not slough off packaged yarns. Emulsifiers and antistatic agents must be found to facilitate the preparation of stable emulsions. In the prior art the chief lubricants have been: mineral oil, carefully selected and/or rearranged glycerides of $C_8$–$C_{18}$ fatty acids; monoalkyl ethers of ethylene-propylene oxide copolymers known under the trade name of "UCON" ®; dibasic acid esters—chiefly sebacates and adipates; diesters of 2-ethyl hexanol such as di, tri or tetra ethylene glycol 2-ethyl hexanoate; esters of hexadecyl alcohol, particularly hexadecyl stearate (isocetyl stearate); silicone liquids—linear polymers of the organosiloxane family; liquid polyoxyalkylenes; and neopentyl polyol esters of which pentaerythritol ester is the most commonly used.

In the Dardoufas patent, U.S. Pat. No. 3,687,721, there is disclosed a polyester yarn including a finish composition. This composition comprises 55–75 weight percent of the lubricant hexadecyl stearate, about 2 percent antioxidant and about 16 percent of a wetting agent including sulfated glycerol trioleate and an ethoxylated alkylamine. The finish composition further includes an HLB balanced emulsifier system including decaglyceryl tetraoleate, glycerol monooleate and ethoxylated tall oil fatty acid. It is further disclosed in the Dardoufas patent that the hexadecyl stearate lubricant may be replaced with up to 50 weight percent of a rearranged triglyceride having $C_{11}$ to $C_{17}$ fatty acid chain members.

In U.S. Pat. No. 4,105,568, issued to Marshall and Dardoufas on Aug. 8, 1978, there is disclosed a finish for polyester yarns which is related to that disclosed in the previously cited Dardoufas patent. In the Marshall and Dardoufas patent, the yarn is first treated with a composition including 10–20 percent coconut oil, 10–20 percent stearic acid ester, 3–6 percent ethoxylated tallow amine, 10–20 percent ethoxylated lauryl alcohol, 8–12 percent of a sodium salt of an alkylarylsulfonate, 1–3 percent dinonyl-sodium-sulfo-succinate, and 35–50 percent white mineral oil. The yarn is then subsequently treated with a composition similar to that disclosed in the Dardoufas patent 3,687,721.

A textile treating emulsion is disclosed in U.S. Pat. No. 3,470,095 issued to Pontelandolfo on Sept. 30, 1969. The emulsion comprises a triglyceride of higher fatty acids, hydrogenated tallow fatty acid, a mixed ester of glycerol and an ethoxylated castor oil. The Coats patent, U.S. Pat. No. 3,248,258 issued on Apr. 26, 1966, discloses a nylon yarn finish including as a lubricant from 90 to 97 percent of a glyceryl triester such as coconut oil, glycerol triacetate and glycerol trioleate, and 3–10 percent of a non-ionic surfactant.

There are many other patents in this field which disclose finish compositions for various yarns or textiles. Other patents disclosing various finish compositions include the following: U.S. Pat. No. 4,126,564, issued to Marshall et al. on Nov. 21, 1978, disclosing a composition of coconut oil, polyoxyethylene, castor oil and ethoxylated tridecyl phosphate; No. 4,019,990, issued to Marshall et. al on Apr. 26, 1977, utilizing polyalkylene glycol and antioxidant; No. 3,853,607, issued to Iyengar et al. on Dec. 10, 1974, including polyorgansiloxane oil, wax and dialkyl phthalate oil; No. 3,672,977, issued to Dardoufas on June 27, 1972, disclosing a composition including hexadecyl stearate, coconut oil, ethoxylated tallow amine, ethoxylated lauryl alcohol, and white mineral oil; No. 3,113,369, issued to Barrett et al. on Dec. 10, 1963 including wax, a fatty acid ester lubricant and emulsifiers; and No. 2,964,470, issued to Wentworth on Dec. 30, 1960 disclosing a composition including polyoxyethylene ether and trimethyl quinoline.

Further examples of formulations in use or under consideration for tire cord include the following. It will be observed that fossil fuel derivatives continue to be a major source of ingredients for finishes for polyester tire yarn. In U.S. Pat. No. 3,387,966, issued to Morana et al. on June 11, 1968, it is recommended to use a specific antioxidant and a diester of the formula R—(O—CH$_2$—CH$_2$)n—O—R, where R is 2-ethylhexyl and n is an integer from 3 to 7. In U.S. Pat. No. 3,464,922, issued to Bernholz et al. on Sept. 2, 1969, the use of trimethylolalkane (e.g. trimethylolethane) esters on synthetic linear organic polymer filaments is taught. In U.S. Pat. No. 3,962,516, issued to Marshall and Dardoufas on June 8, 1976, there is recommended a polyalkylene glycol compound of specific structure, known as UCON ® products of Union Carbide Corporation. In U.S. Pat. No. 4,086,949, issued to Uy on May 2, 1978, the use of a solid lubricant, poly (vinyl alkyl ether) in the finish to impart good adhesion and fatigue resistance is disclosed. Other ingredients are phthalic acid esters, pentaerythritol ester, diundecyl phthalate, polyalkylene and microcrystalline waxes, etc.

There has also been a new universal demand for cleaner, uncontaminated air. In the United States there has been promulgated a stipulation that industrial plants, of which rubber tire manufacturers are typical, must severely reduce the content of noxious substances present in various emissions released into the atmosphere. Such regulations have now been adopted in all of the chief states where rubber tires are produced. These states have introduced legislation based on guidelines from the Environmental Protection Agency. The present invention provides an answer to these requirements.

SUMMARY OF THE INVENTION

The present invention provides in one aspect a finish composition for polyester cord which comprises transesterified coconut oil and glycerol trioleate, polyoxyethylene castor oil, triglycerol monooleate and/or triglycerol dioleate, decaglycerol tetraoleate and/or decaglycerol pentaoleate, and 4'4 butylidene-bis (6-tert-butyl-m-cresol). In a further aspect, the present invention provides polyester cord, and particularly tire cord, including polyester fibers having the finish composition thereon, and also provides tires produced therewith. In addition, the present invention provides a method for finishing polyester cord by the application of the finish composition to the cord.

It is an object of the present invention to provide a finish composition useful for polyester cord, and particularly for polyester tire cord.

A further object of the present invention is to provide a finish composition which inhibits yellowing of the filaments, provides good lubricity and promotes rubber adhesion for polyester cord.

Another object of the present invention is to provide a finish composition which has a high smoke point and low volatility under processing conditions.

It is a further object of the present invention to provide a method for finishing polyester cord, and in particular for providing a polyester cord having improved properties for processing.

It is another object of the present invention to provide a polyester tire cord and tires produced therewith.

Further objects and advantages of the present invention will become apparent from the description of the preferred embodiment which follows.

DESCRIPTION OF THE PREFERRED EMBODIMENT

The present invention provides a finish composition for polyester cord which has several advantageous aspects. The present invention further provides a method for finishing polyester cord and the resulting polyester cord and tires produced therewith. The cost of the finish composition is reasonable and the composition imparts excellent lubricity, promotion of rubber adhesion, and other desired properties.

The function of finishes for polyester yarn used in rubber tires is a highly critical area, due in part because polyester has a very low moisture content of about 0.4%, as opposed to about 4.5–7.5% for various nylons and approximately 11% for viscose rayon. This low moisture content or sorption ability is reflected in the normally poor wetting of finish-free polyester in the aqueous "dip" baths. The difficulty of penetrating the relatively inactive surface of finish-free polyester with an aqueous dispersion of polymeric materials stands in contrast to experience with nylon and with viscose rayon which are more hydrophilic. Hence the finish acquires great importance as an integral part of a commercially acceptable polyester tire cord yarn. Indeed when the polymer is extruded from the spinnerette, and before the application of finish, the fiber has little or no commercial value for use in rubber tires as well as little commercial value for ordinary industrial or textile purposes.

For polyester tire yarn the finish must be formulated from many critically screened individual chemical entities in homogeneous blends of entities to tremendously enhance the value of the previously unmanageable and almost useless fiber by imparting the desired properties, including the following: wetting, back-wetting, static suppression, non-corrosive, self-emulsifiable, rubber adhesive properties, resist flex/fatigue, stable to freeze/thaw cycles, unaffected by oxides of nitrogen, oxides of sulphur and ozone in the atmosphere, minimal change in viscosity due to changes in relative humidity, development of no color bodies when exposed to zenon or carbon arc, incandescent or any other form of light, no polymerization due to heat available in processing or use, compatability with subsequent "dip" systems. In addition the fiber must be kept in pristine working condition through the initial wearing period of the tire, which could reach 60,000 miles plus for passenger radial tires and 100,000 miles for heavy trucks and thereafter maintain the same pristine working condition for recapping of truck tires to reach a total of 300,000 plus miles of use.

Some of these individual properties, essential by common consent of those knowledgeable in the art, can be measured by recognized laboratory techniques. However because so many different properties are involved, and because they interplay with one another and particularly because the total cumulative affect on tire performance cannot be developed or reproduced in the laboratory, the tire industry goes to extreme trouble to evaluate the finish on the yarn by purely practical means, duplicating extreme conditions of possible careless use. First of all the yarn with finish must prove itself acceptable by all known individual laboratory tests to yarn and finish in current use. Thereafter the laboratory tested and laboratory approved yarn plus new finish is manufactured into tires and tested according to Motor Vehicle Safety Standard 109 (known as DOT High Speed Performance Test). The tires also are preferably tested at very high speeds and at varying tire pressure during hot weather with sharp turns, rough surfaces, and never ending pace with heavy loads, sudden braking, fast acceleration, sharp cornering, and purposeful skidding.

The finish composition may suitably comprise from about 55 to about 60 weight percent, and preferably about 57 weight percent, of lubricant comprising a transesterified high lauric oil and high oleic oil. For purposes herein, a high lauric oil is intended to be one which contains at least about 40 percent lauric groups, and a high oleic oil is intended to be one including at least about 60 percent oleic groups. Transesterification of the high lauric oil and high oleic oil may be accomplished in known manner as is well understood in the art. The method of manufacture is well known in the industry, such as is disclosed in "Bailey's Industrial Oil and Fat Products," Third Edition, pages 958–964 (1964). Also for purposes herein, a transesterified high lauric oil and high oleic oil is intended to encompass both the product of a transesterification of the high lauric oil and the high oleic oil, and also the same or a similar product produced by means other than transesterification. The lubricant may include from about 10 to about 90 percent high lauric oil and from about ten to about 90 percent high oleic oil. Examples of high oleic oils contemplated by the present invention would include glycerol trioleate, olive oil, peanut oil, selectively hydrogenated soyabean oil and combinations thereof. Examples of high lauric oils contemplated by the present invention would include coconut oil, palm kernel oil and combinations thereof. The high lauric oils of low Iodine Value and high thermal stability, particularly coconut oil, contribute significantly to the lubricity achieved with the present invention, and the high oleic oil contributes to the rubber adhesion and thermal stability.

The finish composition of the present invention is particularly adapted for use with polyester cord, and most preferably for tire cord. The composition includes a lubricant, an antioxidant, and a combination of emulsifiers. The composition preferably comprises from about 55 to about 60 weight percent, and preferably about 57 weight percent, of lubricant comprising transesterified coconut oil and glycerol trioleate. Materials within this definition are easily prepared, and are commercially available such as the Caplube ® 8365 product of Capital City Products Company, Division of Stokely-Van Camp, Inc., P.O. Box 569, Columbus, Ohio 43216. The Caplube ® 8365 product comprises approximately 50 percent glycerol trioleate and approximately 50 percent coconut oil. A transesterified material may, in accordance with the present invention, include from about 10 to about 90 percent coconut oil and from about 10 to about 90 percent glycerol trioleate.

The finish composition also includes from about 15 to about 28 weight percent, and preferably from about 18 to about 25 weight percent, of an emulsifier polyoxyethylene castor oil. The composition further includes from about 4 to about 15 weight percent, and preferably from about 5.5 to about 12.5 weight percent, of an emulsifier material comprising triglycerol monooleate, triglycerol dioleate and mixtures thereof. A third emulsifier decaglycerol tetraoleate and/or decaglycerol pentaoleate is included in the finish composition in an amount from about 7 to about 12 weight percent, and preferably about 9.5 weight percent. These three emulsifiers provide emulsifiers having a low, middle and high HLB aspect which is considered to be desirable.

A fifth component of the finish composition is a suitable antioxidant present in an amount from about 1 to about 5 weight percent. Preferably, the antioxidant is present in an amount of about 3 weight percent, and the preferred antioxidant is 4,4' butylidene-bis (6-tert-butyl-m-cresol), known commercially under the trademark Santowhite ® Powder and available from Monsanto Company, St. Louis, Mo. Water is preferably added to the lubricant, emulsifiers and antioxidant in an amount at least sufficient to provide a clear and stable blend and later an emulsion of less than one micron size and stable for at least 10 days or more.

A particularly preferred formulation of the present finish composition is one consisting essentially of from about 55 to about 60 weight percent of lubricant comprising transesterified high lauric oil and high oleic oil, from about 15 to about 28 weight percent of emulsifier polyoxyethylene castor oil, from about 4 to about 15 weight percent of an emulsifier material selected from the group consisting of triglycerol monooleate, triglycerol dioleate and mixtures thereof, from about 7 to about 12 weight percent of emulsifier selected from the group consisting of decaglycerol tetraoleate, decaglycerol pentaoleate and mixtures thereof and from about 1 to about 5 weight percent of a suitable antioxidant.

A more preferred formulation for the finish composition of the present invention comprises about 57 weight percent of lubricant comprising transesterified coconut oil and glycerol trioleate, from about 18 to about 25 weight percent of emulsifier polyoxyethylene castor oil, from about 5.5 to about 12.5 weight percent of an emulsifier material selected from the group consisting of triglycerol monooleate, triglycerol dioleate and mixtures thereof, about 8 to 10 weight percent of emulsifier selected from the group consisting of decaglycerol tetraoleate, decaglycerol pentaoleate and mixtures thereof, and about 3 weight percent of antioxidant 4,4' butylidene-bis (6-tert-butyl-m-cresol). A most preferred finish composition consists essentially of about 57 weight percent of lubricant comprising transesterified coconut oil and glycerol trioleate, about 25 weight percent of emulsifier polyoxyethylene castor oil, about 5.5 weight percent of an emulsifier material selected from the group consisting of triglycerol monooleate, triglycerol dioleate and mixtures thereof, about 9.5 weight percent of emulsifier selected from the group consisting of decaglycerol tetraoleate, decaglycerol pentaoleate and mixtures thereof and about 3 weight percent of antioxidant 4,4' butylidene-bis (6-tert-butyl-m-cresol).

As previously indicated, the finish composition of the present invention has a reasonable cost, provides good lubricity and does not yellow the cord to which it is applied when exposed on the fiber to ambient air and light at any stage of manufacturing either in the fiber producers plant, in transit to the rubber producer or in the rubber producers plant. Cord treated with the finish composition can be used, for example, for seat belts since it is able to be dyed without difficulty. The composition does not cause crocking, and is readily removed in a dye bath such that the seat belt dyes evenly. The composition has a high smoke point and low volatility, and therefore remains liquid for a long time and may be wiped off the hot metal plates with which the cord typically is in contact in the drawing (attenuation) process.

The finish composition is readily prepared by mixing together the indicated lubricant, emulsifiers and antioxidant. The lubricant and emulsifiers may suitably be heated to dissolve the Santowhite ® Powder antioxidant but this is not necessary. In a preferred method for preparing the finish composition of the present invention, the lubricant is heated to from about 210° F. to about 250° F. and the Santowhite ® Powder antioxidant is added slowly under agitation. The remaining products are then added as the blend cools to about 120° F., a low amount of water is added if necessary to obtain a crystal clear blend at room temperature. Typically the amount of water necessary to clear the blend is from about 5.0 to about 12.5 weight percent, or generally about 10 weight percent.

The finish composition of the present invention is useful with any type of polyester cord. In particular, the composition is useful with both low carboxyl and normal carboxyl fibers. Examples of products using the polyester cords with which the present finish composition is particularly useful are the following: rubber conveyor belts, rubber tubing and tires.

The finish composition is added to the polyester cord in any of the usual fashions, as are well known in the art. Typically, the blend is combined with water or other solvent with the prepared emulsion comprising from about 15 to about 40 weight percent and the water or other solvent comprising from about 60 to about 85 weight percent. By virtue of data revealed in Table I, which shows no sudden increase in viscosity until nearly 50% concentration is reached, the amount of pick up of finish by the fiber can be easily controlled.

TABLE I

| Percent emulsion | 10 | 20 | 30 | 35 | 40 | 45 | 50 |
|---|---|---|---|---|---|---|---|
| Viscosity in centistokes | 1.2 | 2.1 | 5.5 | 8.4 | 16.9 | 43.5 | 332. |

The mixture is then applied to the polyester cord in accordance with known techniques. Such known techniques may include application at the spinning panel, immediately after extrusion of the polymer from the spinneret, of a 20 to 40 percent emulsion to give from 0.3 to 1.2 percent finish on the fiber depending on the speed of the pick-up roller and the requirements of the operation. Another method is to make a mixture of 40 parts of the composite blended finish and 60 parts of a low viscosity mineral oil or other suitable solvent which will evaporate off completely at hot drawing leaving about 0.2 percent finish on the fiber. Thereafter the amount of finish on the fiber can be increased by application of a 20 to 40 percent aqueous emulsion at the beamer or by any other satisfactory method which increases the pick-up on the fiber. Alternatively, the composition may be applied "neat", without the prior combination with water or other solvents by a spray technique. Preferably, the finish composition is combined with the polyester cord at a rate of from about 0.6 to about 1.2 weight percent finish composition to polyester cord.

The present invention further comprises a polyester cord, and in particular a polyester tire cord, comprising polyester fibers having on the surfaces thereof from about 0.6 weight percent to about 1.2 weight percent, based upon the weight of the resulting cord, of a finish composition as previously described. In particular, the tire cord preferably includes a finish composition which comprises from about 55 to about 60 weight percent, and preferably about 57 weight percent, of a lubricant comprising transesterified high lauric oil and high oleic oil, from about 15 to about 28 weight percent, and preferably from about 18 to about 25 weight percent, of emulsifier polyoxyethylene castor oil, from about 4 to about 15 weight percent, and preferably from about 5.5 to about 12.5 weight percent, of an emulsifier material selected from the group consisting of triglycerol monooleate, triglycerol dioleate and mixtures thereof, from about 7 to about 12 weight percent, and preferably about 8 to 10 weight percent, of emulsifier selected from the group consisting of decaglycerol tetraoleate, decaglycerol pentaoleate and mixtures thereof and from about one to about 5 weight percent of a suitable antioxidant. The high lauric oil is preferably selected from the group consisting of coconut oil, palm kernel oil and combinations thereof, and most preferably is coconut oil. The high oleic oil is preferably selected from the group consisting of glycerol trioleate, olive oil, peanut oil, selectively hydrogenated soybean oil, and combinations thereof, and most preferably is glycerol trioleate. As previously indicated, various antioxidants are known in the art and a suitable antioxidant may be readily determined by direct experimentation. The preferred antioxidant is 4,4' butylidene-bis (6-tert-butyl-m-cresol), known as Santowhite ® powder.

A particularly preferred tire cord of the present invention includes a finish composition which consists essentially of from about 55 to about 60 weight percent, preferably about 57 weight percent, of lubricant comprising transesterified high lauric oil and high oleic oil, from about 15 to about 28 weight percent, and preferably from about 18 to about 25 weight percent, of emulsifier polyoxyethylene castor oil, from about 4 to about 15 weight percent, and preferably from about 5.5 to about 12.5 weight percent, of an emulsifier material selected from the group consisting of triglycerol monooleate, triglycerol dioleate and mixtures thereof, from about 7 to about 12 weight percent, and preferably about 8 to 10 weight percent, of emulsifier selected from the group consisting of decaglycerol tetraoleate, decaglycerol pentaoleate and from about 1 to about 5 weight percent of a suitable antioxidant, preferably about 3 weight percent of 4,4' butylidene-bis (6-tert-butyl-m-cresol).

The preferred method of preparing the aqueous emulsion for use is as follows: This preferred finish is warmed to 100° F. and thoroughly mixed. The necessary amount of water is heated to 120° F. and maintained at that temperature. The water is agitated and the necessary amount of finish is quickly added. The agitation should be such that aeration does not occur. The mass should be stirred for at least 15 minutes to insure adequate dispersion of the finish. Biocides or other additives may be added immediately after the finish is introduced. Dyes used as tinting agents for identification purposes should be added to the water and stirred until complete dispersion or dissolution of the dye is obtained prior to the introduction of the finish. The pH of the emulsion can be adjusted to the required degree dependent upon pH of the subsequent latex dip systems to be used. The aqueous emulsion is cooled to ambient temperature before use.

One aspect of the finish composition of the present invention is that it does not develop color in or on the polyester cord to which it is applied. The composition on the fiber is not appreciably affected by ordinary daylight, sunlight, ordinary artificial electric light, zenon or carbon arc lights. Further, color is not appreciably developed from airborne contaminants such as oxides of nitrogen or in other applications of polyester cord as well as tire cords. Yellowing and other unfavorable color affects have been attributed to certain prior art compositions. Polyester tire yarn is also woven into seat belts and dyed, often continuously by the high temperature Thermosol method. The present composition contributes to the success of this operation and contributes to the even application of tinting colors used at the beaming of polyester tire yarns.

The present invention also provides a tire produced with the finished polyester cord. When polyester tire yarn from the fiber producer reaches the textile manufacturing section of a rubber tire producer, three virtually limitless lengths of yarn are twisted together making a three/ply cord. This cord is then processed at fairly high speed through a Litzler machine where it is impregnated with one or two concoctions of Resorcinol/Formaldehyde/Latex alone if the fiber producer had applied a rubber adhesion activated finish, and a second concoction of rubber adhesive chemicals for a "two dip" system if no rubber adhesion activator had been applied by the fiber producer.

The temperature by which the cords are dried in the Litzler is about 320–470° for a dwell time of 50–180 seconds. When a second dip is used the temperature is about 350° F. followed by curing at about 450° F. for 50–90 seconds. Thereafter the treated yarn now holding about 5% of added solids by virtue of these operations is now introduced to the actual rubber compounds of which the tire is made. The whole is vulcanized together under conditions of the general order of 10 Tons psi at 320° F., with time depending on thickness of rubber from a low of 20 minutes for a thin strip of rubber to ten times or more for a thicker structure. All these processes, at these temperatures, release emissions to the atmosphere.

It will be seen therefore that the polyester fiber itself is surrounded not only by its own fiber-finish applied by the fiber producer but also by adhesion activators such as resorcinol formaldehyde latex which is a vinyl pyridine/butadiene/styrene latex polymer. In addition adhesion promotors may be added. An example is disclosed in British Pat. No. 1,154,007, which describes a dip using resorcinol, caustic soda, formaldehyde "Gen Tac" ® a butadiene-styrene-vinyl pyridine copolymer latex, a styrene-butadiene copolymer latex, N-3, a reaction product of resorcinol, triallylcyanurate and formaldehyde, plus butyl benzoate as an extra adhesion promotor.

EXAMPLE 1

A finish composition was prepared using 57 weight percent of lubricant comprising 50 percent transesterified coconut oil and 50 percent glycerol trioleate; 25 weight percent polyoxyethylene castor oil; 5.5 percent of a mixture of triglycerol monooleate and triglycerol dioleate; 9.5 percent decaglycerol tetraoleate; and 3 weight percent of the antioxidant 4,4' butylidene-bis (6-tert-butyl-m-cresol).

The finish composition was found to provide a good, clear stable emulsion in water, and was readily applied to a polyester cord in usual fashion. The resulting cord was found to display the improved properties previously described, and particularly showed good wetting, back-wetting, static suppression and rubber adhesive properties, inertness to various forms of light, a high smoke point resulting in low emission and low volatility, good lubricity, and good compatibility with dip systems.

EXAMPLE 2

A tire cord treated with a finish composition of the present invention, in accordance with Example 1, was tested by thermal gravimetric analysis. The composition was applied to the yarn as a 15 percent aqueous emulsion, and, after drying, the cord had a 0.78 percent finish on it. The isothermal TGA method was carried out at 240° C. for 20 minutes in air, with readings taken at 5, 10, 15 and 20 minutes. The percent of weight loss under these conditions was 1.0, 1.2, 1.6 and 2.1, for the respective 5 minute intervals. In a comparison with a dozen other typical prior art finish compositions, the composition of the present invention rated the highest in the thermal gravimetric analysis.

EXAMPLE 3

Testing of the finish composition of Example 1 was further conducted using a Litzler Computator in a two dip system. The polyester dips used were the standard "Gen Tac" ® dips D417 and D5, which have the following properties:

|  | One Batch |
|---|---|
| First Phase | |
| D-417 Dip | |
| 1. Hylene ® MP 40% Dispersion | 9.00 grams |
| 2. Epon ® 812 | 1.36 grams |
| 3. Soft Water | 89.64 grams |
| | 100.00 grams |
| Note: Hylene ® MP 40% Dispersion | |
| 1. Hylene ® MP | 38.72 grams |
| 2. Soft Water | 60.00 grams |
| 3. Aerosol OT | 1.28 grams |
| | 100.00 grams |
| Second Phase | |
| D5 Ammoniated Dip | |
| A. Resin Master | |
| 1. Soft Water | 238.5 grams |
| 2. Sodium Hydroxide | 0.3 grams |
| 3. Resorcinol | 11.0 grams |
| 4. Formaldehyde 37% | 16.2 grams |
| | 266.0 grams |
| B. Final Dip | |
| 1. Soft Water | 60.0 grams |
| 2. Gen Tac ® 41% | 244.0 grams |
| 3. Resin Master | 266.0 grams |
| 4. Ammonium Hydroxide 28% | 11.3 grams |
| | 581.3 grams |

The Litzler conditions for the analysis were as follows:

| D 417 | Oven 1 | Temperature °F. | 320 |
|---|---|---|---|
| | | Dwell Time Seconds | 90 |
| | Oven 2 | Temperature °F. | 470 |
| | | Dwell Time Seconds | 50 |
| D 5 | Oven 1 | Temperature °F. | Cold |
| | | Dwell Time Seconds | 50 |
| | Oven 2 | Temperature °F. | 444 |
| | | Dwell Time Seconds | 50 |

The treated cords were then made into rubber strips, cured, and pulled on the Instron testing apparatus.

The result of the analysis for the sample using the finish of Example 1 showed a complete coverage of the rubber on the cord at a pounds pull of 51.7. In contrast, the commercial feed stock showed only about half coverage of the rubber on the cord at a pounds pull of 52.1. Several other finish materials in the same analysis showed inferior results to the finish of the invention. Further, the physical properties of the treated cord after being conditioned for 12 hours at 76° F., 55 percent RH, showed a strength of 51.8, conversion loss of 12.2 and a dip pick up of 4.53. These results showed that the finish composition provided a superior resultant cord displaying improved properties desirable for processing.

EXAMPLE 4

Tires were produced using the treated cord of Example 1 in usual fashion. These tires were tested under moderate and severe conditions of use and of weather. No significant problems were observed with the tires, and the results showed that the tire cord promoted good adhesion for use in the tire and produced a very acceptable tire.

EXAMPLE 5

Similar procedures and results as related in Examples 1-4 are achieved with a finish composition including 57 weight percent of lubricant comprising either 10 or 90 percent transesterified coconut oil and 90 or 10 percent glycerol trioleate, respectively. Similar results are also obtained for the finish composition of Example 1 with 18 percent or 21 percent polyoxyethylene castor oil. In addition, similar results are also obtained with the use of a finish composition identical to that of Example 1 with the exception that 9 or 12.5 percent of an emulsifier mixture of triglycerol monooleate and triglycerol dioleate, or with from 5.5 to 12.5 of either of the triglycerol monooleate or triglycerol dioleate. Similar results are also obtained for the finish composition of example 1 with the exception that 7 or 12 weight percent of decaglycerol tetraoleate are used, or further in which from 7 to 12 weight percent of a mixture of decaglycerol tetraoleate and decaglycerol pentaoleate or simply the decaglycerol pentaoleate are used.

EXAMPLE 6

The finish composition of Example 1 is used to treat polyester cord, and to make tires therewith, with the exception that 55-60 weight percent of lubricant is used which comprises 10-90 percent of a high lauric oil and 10-90 percent of a high oleic oil; from about 15-28 weight percent polyoxyethylene castor oil; and 1-5 weight percent of a suitable antioxidant. Similar results are obtained. In addition, similar results are achieved for the described finish composition in which the high oleic oil is one or more of glycerol trioleate, olive oil, peanut oil, and selectively hydrogenated soybean oil; and also in which the high lauric oil is one or more of coconut oil and palm kernel oil.

What is claimed is:

1. A finish composition for polyester tire cord which comprises:
    about 57 weight percent of lubricant comprising transesterified coconut oil and glycerol trioleate, said lubricant including from about 10 to about 90 percent coconut oil and from about 10 to about 90 percent glycerol trioleate;
    from about 18 to about 25 weight percent of emulsifier polyoxyethylene castor oil;
    from about 5.5 to about 12.5 weight percent of an emulsifier material selected from the group consisting of triglycerol monooleate, triglycerol dioleate and mixtures thereof;

from about 7 to about 12 weight percent of emulsifier selected from the group consisting of decaglycerol tetraoleate, decaglycerol pentaoleate and mixtures thereof; and about 3 weight percent of antioxidant 4,4' butylidene-bis (6-tert-butyl-m-cresol).

2. The finish composition of claim 1 and further including an amount of water at least sufficient to provide a clear blend.

3. The finish composition of claim 1 consisting essentially of:

about 57 weight percent of lubricant comprising transesterified coconut oil and glycerol trioleate, said lubricant including from about 10 to about 90 percent coconut oil and from about 10 to about 90 percent glycerol trioleate;

from about 18 to about 25 weight percent of emulsifier polyoxyethylene castor oil;

from about 5.5 to about 12.5 weight percent of an emulsifier material selected from the group consisting of triglycerol monooleate, triglycerol dioleate and mixtures thereof;

from about 7 to about 12 weight percent of emulsifier selected from the group consisting of decaglycerol tetraoleate, decaglycerol pentaoleate and mixtures thereof; and about 3 weight percent of antioxidant 4,4' butylidene-bis (6-tert-butyl-m-cresol).

4. A finish composition for polyester cord which comprises:

from about 55 to about 60 weight percent of lubricant comprising transesterified high lauric oil and high oleic oil, said lubricant including from about 10 to about 90 percent high lauric oil and from about 10 to about 90 percent high oleic oil;

from about 15 to about 28 weight percent of emulsifier polyoxyethylene castor oil;

from about 4 to about 15 weight percent of an emulsifier material selected from the group consisting of triglycerol monooleate, triglycerol dioleate and mixtures thereof;

from about 7 to about 12 weight percent of emulsifier selected from the group consisting of decaglycerol tetraoleate, decaglycerol pentaoleate and mixtures thereof; and from about 1 to about 5 weight percent of a suitable antioxidant.

5. The finish composition of claim 4 in which the high oleic oil of said lubricant is selected from the group consisting of glycerol trioleate, olive oil, peanut oil, selectively hydrogenated soybean oil and combinations thereof.

6. The finish composition of claim 4 in which said antioxidant comprises 4,4' butylidene-bis (6-tert-butyl-m-cresol).

7. The finish composition of claim 4 in which the high lauric oil of said lubricant is selected from the group consisting of coconut oil, palm kernel oil and combinations thereof.

8. The finish composition of claim 7 in which the high oleic oil of said lubricant is selected from the group consisting of glycerol trioleate, olive oil, peanut oil, selectively hydrogenated soybean oil and combinations thereof.

9. The finish composition of claim 8 in which said antioxidant comprises 4,4' butylidene-bis (6-tert-butyl-m-cresol).

10. The finish composition of claim 9 in which the high lauric oil is coconut oil.

11. The finish composition of claim 10 in which the high oleic oil is glycerol trioleate.

12. The finish composition of claim 11 and further including an amount of water at least sufficient to provide a clear emulsion.

13. The finish composition of claim 4 consisting essentially of:

from about 55 to about 60 weight percent of lubricant comprising transesterified high lauric oil and high oleic oil, said lubricant including from about 10 to about 90 percent high lauric oil and from about 10 to about 90 percent high oleic oil;

from about 15 to about 28 weight percent of emulsifier polyoxyethylene castor oil;

from about 4 to about 15 weight percent of an emulsifier material selected from the group consisting of triglycerol monooleate, triglycerol dioleate and mixtures thereof;

from about 7 to about 12 weight percent of emulsifier selected from the group consisting of decaglycerol tetraoleate, decaglycerol pentaoleate and mixtures thereof; and from about 1 to about 5 weight percent of a suitable antioxidant.

14. The finish composition of claim 13 in which the high lauric oil is coconut oil and the high oleic oil is glycerol trioleate.

15. The finish composition of claim 14 in which said antioxidant comprises 4,4' butylidene-bis (6-tert-butyl-m-cresol).

16. A tire cord comprising polyester fibers having on the surfaces thereof from about 0.6 weight percent to about 1.2 weight percent, based upon the weight of the resulting cord, of a finish composition which comprises:

from about 55 to about 60 weight percent of a lubricant comprising tranesterified high lauric oil and high oleic oil, said lubricant including from about 10 to about 90 percent high lauric oil and from about 10 to about 90 percent high oleic oil;

from about 15 to about 28 weight percent of emulsifier polyoxyethylene castor oil;

from about 4 to about 15 weight percent of an emulsifier material selected from the group consisting of triglycerol monooleate, triglycerol dioleate and mixtures thereof;

from about 7 to about 12 weight percent of emulsifier selected from the group consisting of decaglycerol tetraoleate, decaglycerol pentaoleate and mixtures thereof; and from about 1 to about 5 weight percent of a suitable antioxidant.

17. The tire cord of claim 16 in which the high lauric oil of said lubricant is selected from the group consisting of coconut oil, palm kernel oil and combinations thereof.

18. The tire cord of claim 16 in which the high oleic oil of said lubricant is selected from the group consisting of glycerol trioleate, olive oil, peanut oil, selectively hydrogenated soybean oil and combinations thereof.

19. The tire cord of claim 16 in which said antioxidant comprises 4,4' butylidene-bis (6-tert-butyl-m-cresol).

20. The tire cord of claim 16 in which the high lauric oil is coconut oil and the high oleic oil is glycerol trioleate.

21. The tire cord of claim 16 in which the finish composition comprises about 57 weight percent of lubricant, from about 18 to about 25 weight percent of emulsifier polyoxyethylene castor oil, from about 5.5 to about 12.5 weight percent of an emulsifier material selected from the group consisting of trigylcerol monooleate, triglycerol dioleate and mixtures thereof, about 9.5 weight percent of emulsifier selected from the group consisting of decaglycerol tetraoleate, decaglycerol pentaoleate and mixtures thereof, and about 3 weight percent of 4,4' butylidene-bis (6-tert-butyl-m-cresol).

22. The tire cord of claim 21 in which the finish composition comprises about 25 weight percent of emulsifier polyoxyethylene castor oil and about 5.5 weight percent of an emulsifier material selected from the group consisting of triglycerol monooleate, triglycerol dioleate and mixtures thereof.

23. The tire cord of claim 16 in which the finish composition consists essentially of:
from about 55 to about 60 weight percent of a lubricant comprising transesterified high lauric oil and high oleic oil, said lubricant including from about 10 to about 90 percent high lauric oil and from about 10 to about 90 percent high oleic oil;
from about 15 to about 28 weight percent of emulsifier polyoxyethylene castor oil;
from about 4 to about 15 weight percent of an emulsifier material selected from the group consisting of triglycerol monooleate, triglycerol dioleate and mixtures thereof;
from about 7 to about 12 weight percent of emulsifier selected from the group consisting of decaglycerol tetraoleate, decaglycerol pentaoleate and mixtures thereof; and
from about 1 to about 5 weight percent of a suitable antioxidant.

24. The tire cord of claim 23 in which the high lauric oil is coconut oil and the high oleic oil is glycerol trioleate.

25. The tire cord of claim 24 in which said antioxidant comprises 4,4' butylidene-bis (6-tert-butyl-m-cresol).

26. The tire cord of claim 23 in which the finish composition consists essentially of about 57 weight percent of lubricant, from about 18 to about 25 weight percent of emulsifier polyoxyethylene castor oil, from about 5.5 to about 12.5 weight percent of an emulsifier material selected from the group consisting of triglycerol monooleate, triglycerol dioleate and mixtures thereof, from about 7 to about 12 weight percent of emulsifier selected from the group consisting of decaglycerol tetraoleate, decaglycerol pentaoleate and mixtures thereof, and about 3 weight percent of 4,4' butylidene-bis (6-tert-butyl-m-cresol).

27. The tire cord of claim 26 in which the finish composition consists essentially of about 25 weight percent of emulsifier polyoxyethylene castor oil and about 5.5 weight percent of an emulsifier material selected from the group consisting of triglycerol monooleate, triglycerol dioleate and mixtures thereof.

28. A tire produced with the polyester tire cord of claim 16.

29. In a tire including a polyester cord, the improvement consisting of the polyester cord comprising:
from about 55 to about 60 weight percent of a lubricant comprising transesterified high lauric oil and high oleic oil, said lubricant including from about 10 to about 90 percent high lauric oil and from about 10 to about 90 percent high oleic oil;
from about 15 to about 28 weight percent of emulsifier polyoxyethylene castor oil;
from about 4 to about 15 weight percent of an emulsifier material selected from the group consisting of triglycerol monooleate, triglycerol dioleate and mixtures thereof;
from about 7 to about 12 weight percent of emulsifier selected from the group consisting of decaglycerol tetraoleate, decaglycerol pentaoleate and mixtures thereof; and
from about 1 to about 5 weight percent of a suitable antioxidant.

* * * * *